United States Patent
Takamura et al.

(10) Patent No.: US 10,654,425 B2
(45) Date of Patent: May 19, 2020

(54) VEHICLE WITH INDIVIDUAL COMPARTMENTS

(71) Applicant: HONDA MOTOR CO., LTD., Minato-ku, Tokyo (JP)

(72) Inventors: Yuki Takamura, Wako (JP); Kazutaka Tateishi, Wako (JP); Tabito Sugiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 16/239,251

(22) Filed: Jan. 3, 2019

(65) Prior Publication Data

US 2019/0225167 A1 Jul. 25, 2019

(30) Foreign Application Priority Data

Jan. 22, 2018 (JP) .................. 2018-008070

(51) Int. Cl.
| | | |
|---|---|---|
| *B60R 13/08* | (2006.01) | |
| *B60N 2/005* | (2006.01) | |
| *B60N 2/01* | (2006.01) | |
| *B62D 31/00* | (2006.01) | |
| *B60N 3/00* | (2006.01) | |
| *B62D 63/02* | (2006.01) | |
| *B62D 31/02* | (2006.01) | |
| *B62D 25/06* | (2006.01) | |

(52) U.S. Cl.
CPC ............ *B60R 13/0823* (2013.01); *B60N 2/01* (2013.01); *B62D 31/00* (2013.01); *B62D 31/025* (2013.01); *B62D 63/02* (2013.01); *B60N 3/001* (2013.01); *B62D 25/06* (2013.01)

(58) Field of Classification Search
CPC .. B60N 2/005; B60N 2/01; B60N 2/24; B60R 13/0823; B62D 31/00; B62D 31/003; B62D 31/025; B60Y 2200/11; B60Y 2200/112; B60Y 2304/01; B64D 11/0601
USPC .................................................. 296/64, 24.46
See application file for complete search history.

(56) References Cited

U.S. PATENT DOCUMENTS

| | | | | |
|---|---|---|---|---|
| 1,352,066 | A * | 9/1920 | Jones ..................... | B62D 31/00 180/89.1 |
| 2,947,349 | A * | 8/1960 | Kryter ................ | B64D 11/0601 297/174 R |
| 4,415,051 | A * | 11/1983 | Taylor ................... | E21F 13/004 105/344 |
| 4,489,972 | A * | 12/1984 | Monzini .................. | B60N 2/01 296/181.1 |
| 10,106,206 | B1 * | 10/2018 | Baccouche ............ | B60R 5/044 |
| 10,596,923 | B2 * | 3/2020 | Baccouche ............ | B60J 5/0423 |

(Continued)

FOREIGN PATENT DOCUMENTS

WO 2007013164 A1 2/2007

*Primary Examiner* — Gregory A Blankenship
(74) *Attorney, Agent, or Firm* — Armstrong Teasdale LLP (57) ABSTRACT

The vehicle (1) is provided with a pair of front compartments and a pair of rear compartments that are inclined to a first lateral side toward rear parts thereof. A front part (23B) of the rear compartment (23) on the first lateral side is positioned between rear parts (21B, 22B) of the front compartments (21, 22) while a rear part (22B) of the front compartment (22) on a second lateral side opposite from the first lateral side is positioned between front parts (23B, 24B) of the rear compartments (23, 24).

11 Claims, 8 Drawing Sheets

(56) References Cited

U.S. PATENT DOCUMENTS

| | | | |
|---|---|---|---|
| 2014/0035330 A1* | 2/2014 | Henshaw | B64D 11/0601 297/174 R |
| 2015/0329208 A1* | 11/2015 | Eakins | B64D 11/0601 297/232 |
| 2018/0281959 A1* | 10/2018 | Braca | B64D 11/0601 |
| 2018/0312082 A1* | 11/2018 | Lalague | B60R 21/026 |
| 2018/0312127 A1* | 11/2018 | Lalague | B62D 33/042 |
| 2019/0143845 A1* | 5/2019 | Akaike | B64D 11/0648 297/240 |
| 2019/0202377 A1* | 7/2019 | Mizutani | B60R 13/0275 |
| 2019/0225167 A1* | 7/2019 | Takamura | B62D 63/02 |
| 2019/0359084 A1* | 11/2019 | Ellis | B60N 2/20 |
| 2020/0017051 A1* | 1/2020 | Erlacher | B60N 2/01 |
| 2020/0017058 A1* | 1/2020 | Jaradi | B60R 21/231 |
| 2020/0037757 A1* | 2/2020 | Onoyama | B60N 2/005 |
| 2020/0039384 A1* | 2/2020 | Takamura | B60N 3/002 |
| 2020/0039385 A1* | 2/2020 | Takamura | B60N 2/01 |
| 2020/0039386 A1* | 2/2020 | Takamura | B60N 2/02 |
| 2020/0039388 A1* | 2/2020 | Onoyama | B60N 2/0292 |

\* cited by examiner

VEHICLE WITH INDIVIDUAL COMPARTMENTS

TECHNICAL FIELD

The present invention relates to a passenger vehicle, and in particular to a vehicle having a cabin which is separated into a plurality of individual compartments by partition walls.

BACKGROUND ART

In a public transportation vehicle such as a train and a bus, the passengers have to share a space with strangers. As a result, some of the passengers may experience some discomfort, and privacy may not be protected. To alleviate this problem, it has been proposed to provide partition walls in a bus to separate the individual seats from one another. See WO2007-013164A, for instance. According to the proposal disclosed in this patent document, the cabin is separated into individual seat cells (compartments) by partition walls each containing a seat. Such seat sells are arranged in two tiers on either side of an aisle extending in the fore and aft direction in the center of the bus.

This arrangement is possible only in the case of a relatively large vehicle such as a bus, and cannot be applied to passenger vehicles that are designed to take only four to five passengers. Ride share is gaining popularity as it is considered as a solution to the problem of traffic congestion and contributes to the reduction of $CO_2$ emission. Ride share is typically practiced by using small passenger vehicles, and passengers may share a ride with strangers. Therefore, there is a need to reduce the discomfort of passengers sharing a ride with strangers, and ensure some privacy in ride share.

SUMMARY OF THE INVENTION

In view of such a problem of the prior art, a primary object of the present invention is to provide a vehicle having a cabin which is separated into a plurality of individual compartments by partition walls.

A second object of the present invention is to provide a vehicle provided with individual compartments which are spacious enough for the occupants even when the size of the vehicle is limited.

A third object of the present invention is to provide a vehicle which is suitable for use in ride share.

To achieve such an object, the present invention provides a vehicle (1), comprising a pair of front compartments (21, 22) and a pair of rear compartments (23, 24) separated from each other by partition walling (17); wherein the front compartments and the rear compartments are inclined to a first lateral side toward rear parts thereof, and a front part (23B) of the rear compartment (23) on the first lateral side is positioned between rear parts (21B, 22B) of the front compartments (21, 22) while a rear part (22B) of the front compartment (22) on a second lateral side opposite from the first lateral side is positioned between front parts (23B, 24B) of the rear compartments (23, 24).

Typically, each compartment is elongated in a prescribed direction which may be referred to as major axial line, and by slanting the major axial lines of the different compartment with respect to the fore and aft direction of the vehicle, the length of each compartment along the major axial line can be maximized. Thereby, each occupant is enabled to stretch one's legs, and the comfort of the occupant can be enhanced. In particular, since a front part of the rear compartment on the first lateral side is positioned between rear parts of the front compartments while a rear part of the front compartment on a second lateral side opposite from the first lateral side is positioned between front parts of the rear compartments, the length of each compartment can be particularly maximized.

Preferably, a front part of the rear compartment on the second lateral side is positioned on the second lateral side of a rear part of the front compartment on the second lateral side.

Thereby, the length of each compartment on the second lateral side can be maximized for the given fore and aft dimension of the vehicle.

Preferably, a rear part of the front compartment on the first lateral side is positioned on the first lateral side of a front part of the rear compartment on the first lateral side.

Thereby, the length of each compartment on the first lateral side can be maximized for the given fore and aft dimension of the vehicle.

Preferably, the front part of each front compartment is laterally wider than the rear part thereof, and the rear part of each rear compartment is laterally wider that the front part thereof.

Thereby, the rear parts of the front compartments and the front parts of the rear compartments can be arranged laterally in an interdigitated relationship.

Preferably, the front compartments are each provided with a seat (63) facing obliquely rearward, and the rear compartments are each provided with a seat facing obliquely forward.

Thereby, the seat in each compartment can be arranged so as to face in the direction of the major axial line so that the comfort of the occupant can be maximized for the give available space.

Preferably, a combined outer profile of the front compartments and the rear compartments in plan view is substantially rectangular.

Thereby, the rectangular space available in a typical vehicle can be optimally utilized.

Preferably, at least one of the front parts of the rear compartments and the rear parts of the front compartments is provided with a table (66).

Thereby, the occupant can place one's legs on the table for improved comfort. The table may also be used as a table or a desk to place an item thereon, and as a space for stowing luggage.

Preferably, the front compartment on the first lateral side and the rear compartment on the second lateral side are rotationally symmetric to each other, and the front compartment on the second lateral side and the rear compartment on the first lateral side are rotationally symmetric to each other.

Thereby, the compartments can be arranged in a favorable manner, and common components can be shared by the different compartments.

Preferably, the different compartments are provided with individual doors (56-59).

Thereby, the occupants can get on and off the vehicle without meeting other fellow passengers so that the privacy of each occupant can be ensured.

Preferably, the vehicle comprises an autonomous vehicle.

In such a case, the vehicle may not be provided with a driver's seat, and the entire space of the vehicle can be dedicated to the compartments for the occupants.

Preferably, the vehicle has a capacity for four occupants.

Thereby, the vehicle can provide compartments for four occupants or passengers.

According to the above configuration, a vehicle that is suitable for ride share is provided, and the vehicle can offer a spacious compartment to each occupant.

DESCRIPTION OF THE PREFERRED EMBODIMENT(S)

A preferred embodiment of the present invention is described in the following with reference to the appended drawings. The directions referred to in the following description are based on the view point of a vehicle occupant generally facing the traveling direction of the vehicle.

Figure 1:
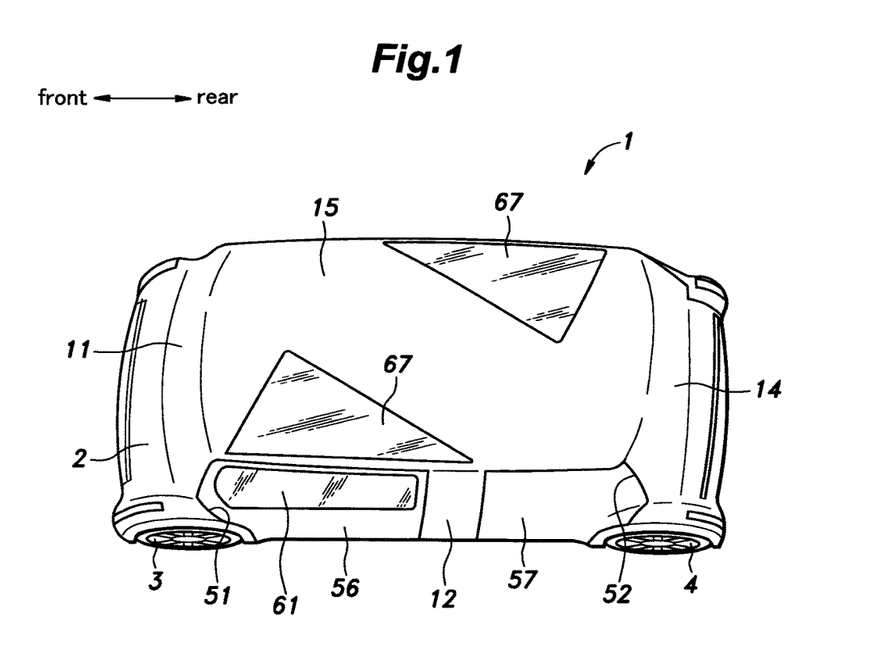
FIG. 1 is a perspective view of a vehicle according to a preferred embodiment of the present invention.
Figure 2:
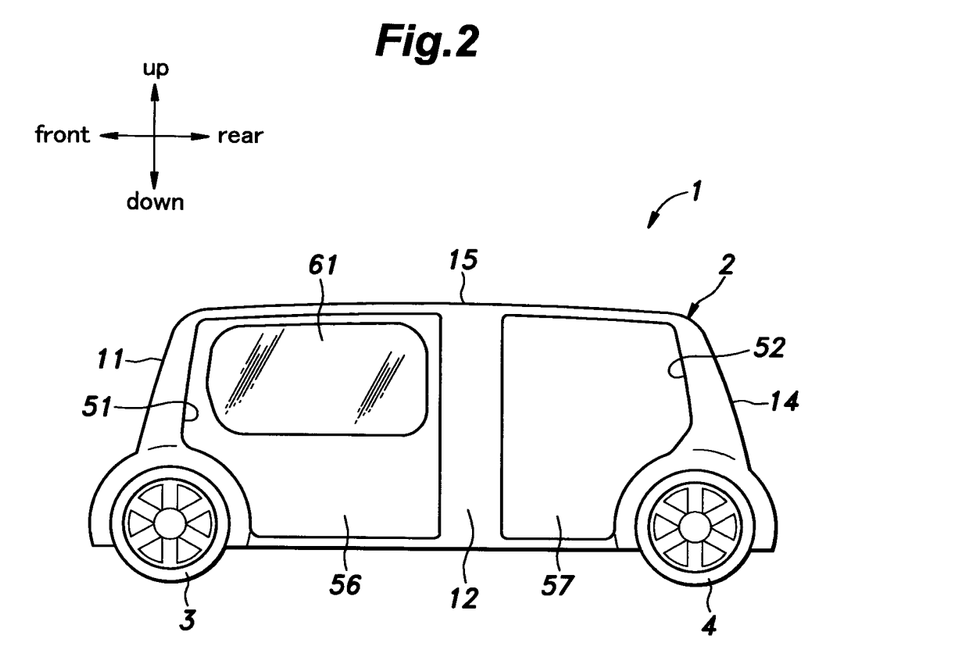
FIG. 2 is a left side view of the vehicle.
Figure 3:
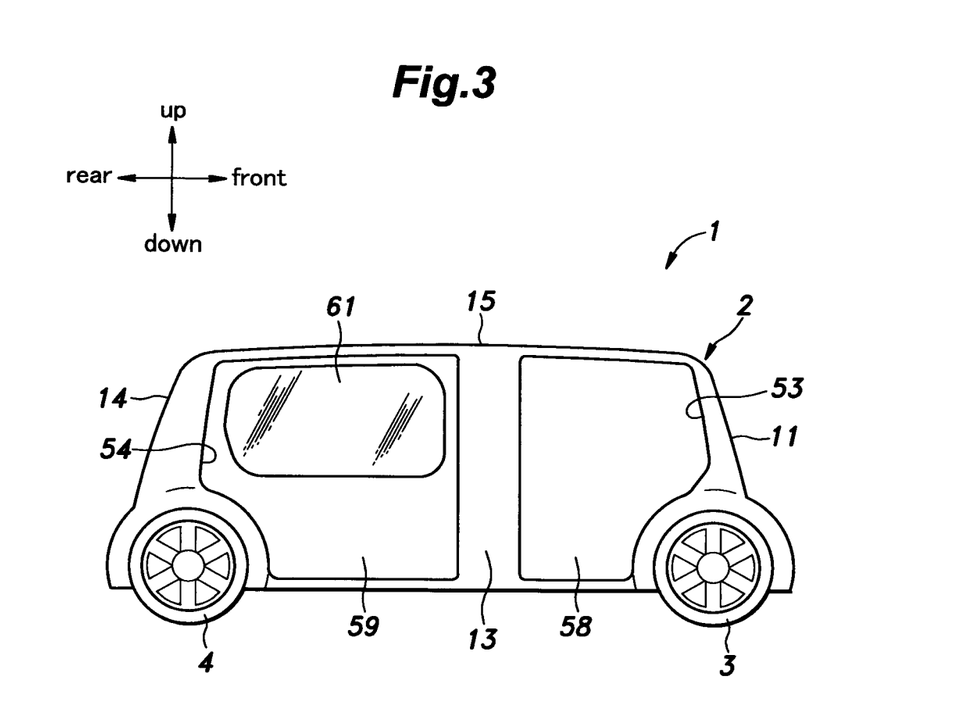
FIG. 3 is a right side view of the vehicle.

As shown in FIGS. 1 to 3, the vehicle 1 according to the embodiment of the present invention is a four-wheeled vehicle, and has a capacity for four passengers. The vehicle 1 has a substantially rectangular vehicle body 2 elongated in the fore and aft direction. The vehicle body 2 is provided with a pair of front wheels 3 and a pair of rear wheels 4. The vehicle 1 consists of an autonomous vehicle that does not require a driver, and is not provided with any driver's seat. Alternatively, an additional compartment may be provided in a front end part of the vehicle to accommodate a seat for the driver of the vehicle.

As shown in FIGS. 1 to 4, a substantially rectangular cabin 5 elongated in the fore and aft direction is defined in the central part of a vehicle body 2 (in plan view). The cabin 5 is provided with a floor 6, a front wall 11 extending laterally in the front end part of the cabin 5, a pair of side walls 12 and 13 extending rearward from either side edge of the front wall 11, a rear wall 14 extending between the rear edges of the side walls 12, and a roof 15 extending between the upper edges of the front wall 11, the side walls 12 and 13 and the rear wall 14.

Figure 4:
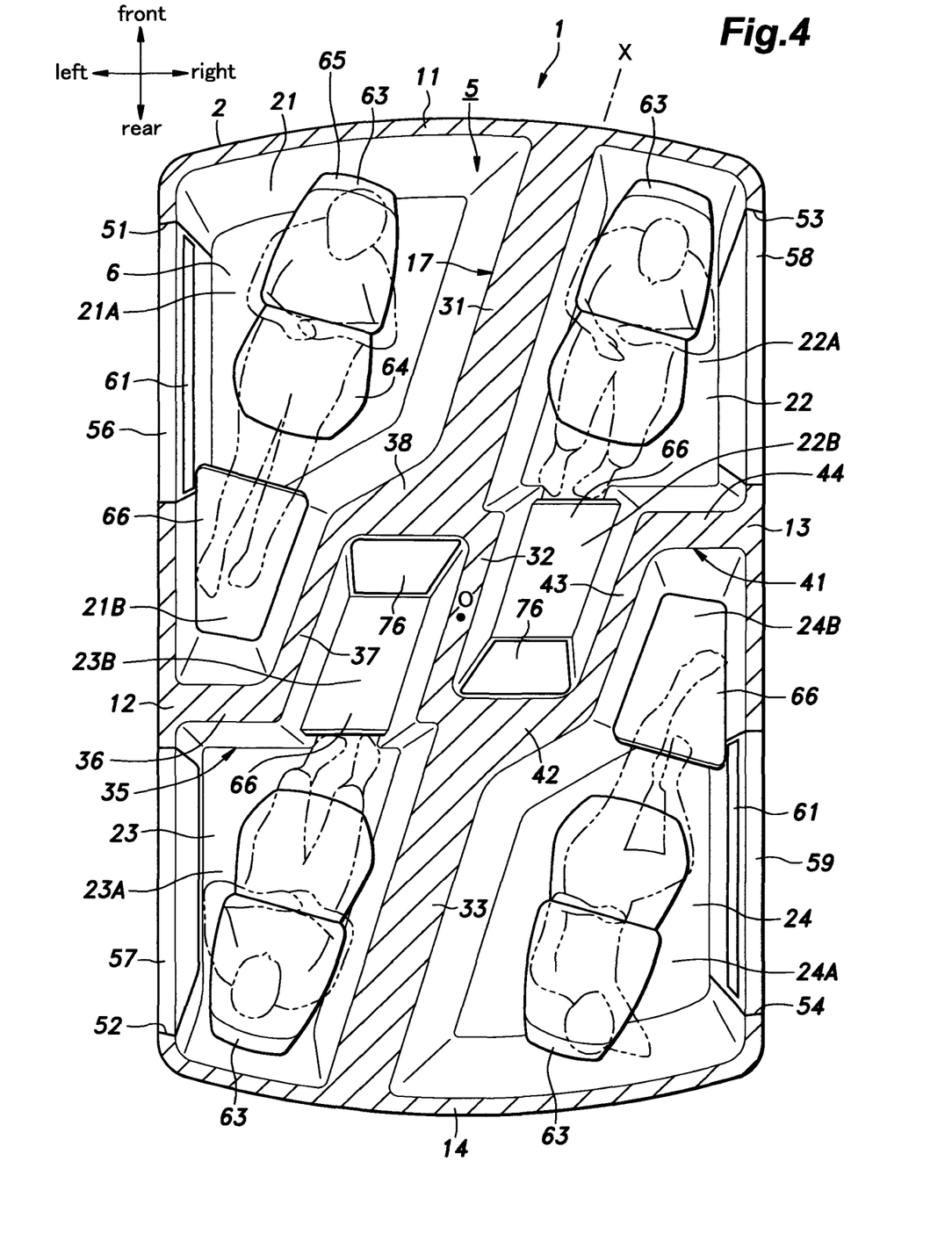
FIG. 4 is a horizontal sectional view of the vehicle.

As shown in FIG. 4, the cabin 5 is provided with four compartments including a pair of front compartments 21 and 22 and a pair of rear compartments 23 and 24 partitioned from each other by partition walling 17. The front compartments 21 and 22 include a left front compartment 21 provided on the left side (first lateral side) and a right front compartment 22 provided on the right side (second lateral side) of the left front compartment 21. The rear compartments 23 and 24 include a left rear compartment 23 provided to the rear of the left front compartment 21 and a right rear compartment 24 provided on the right side of the left rear compartment 23.

Each compartment is elongated generally in the fore and aft direction (at an angle to the fore and aft direction), and is thus provided with a major axial line X extending in the lengthwise direction of the compartment. As best shown in FIG. 4, the left front compartment 21, the right front compartment 22, the left rear compartment 23 and the right rear compartment 24 each extend obliquely to one lateral side (left side; first lateral side) toward the rear. In particular, the major axial line X of each compartment extends at an angle of 5 to 40° with respect to the fore and aft direction of the vehicle.

The front part 21A of the left front compartment 21 is provided with a greater width than the rear part 21B thereof. Similarly, the rear part 24A of the right rear compartment 24 is provided with a greater width than the front part 24B thereof. Further, the front part 22A of the right front compartment 22 is provided with a greater width than the rear part 22B thereof. Similarly, the rear part 23A of the left rear compartment 23 is provided with a greater width than the front part 23B thereof.

The front part 23B of the left rear compartment 23 is positioned between the rear part 21B of the left front compartment 21 and the rear part 22B of the right front compartment 22. The rear part 22B of the right front compartment 22 is positioned between the front part 23B of the left rear compartment 23 and the front part 24B of the right rear compartment 24. The front part 24B of the right rear compartment 24 is positioned on the right side of the rear part 22B of the right front compartment 22. The rear part 21B of the left front compartment 21 is positioned on the left side of the front part 23B of the left rear compartment 23. Thus, in the central part of the cabin 5 with respect to the fore and aft direction, the rear part 21B of the left front compartment 21, the front part 23B of the left rear compartment 23, the rear part 22B of the right front compartment 22, and the front part 24B of the right rear compartment 24 are arranged from left to right in that order in an interdigitated manner. In the front part of the cabin 5, the front part 21A of the left front compartment 21 and a front part 22A of the right front compartment 22 are arranged laterally in that order from the left side. In the rear part of the cabin 5, the rear part 23A of the left rear compartment 23 and the rear part 24A of the right rear compartment 24 are arranged laterally in that order from the left side.

The partition walling 17 includes a first longitudinal partition wall 31 that separates the front part 21A of the left front compartment 21 and the front part 22A of the right front compartment 22 from each other, a second longitudinal partition wall 32 that separates the front part 23B of the left rear compartment 23 and the rear part 22B of the right front compartment 22 from each other, and a third longitudinal partition wall 33 that separates the rear part 23A of the left rear compartment 23 and the rear part 24A of the right rear compartment 24 from each other.

The front end of the first longitudinal partition wall 31 is connected to the front wall 11, the rear end of the first longitudinal partition wall 31 is connected to the front end of the second longitudinal partition wall 32, and the rear end of the second longitudinal partition wall 32 is connected to the front end of the third longitudinal partition wall 33, and the rear end of the third longitudinal partition wall 33 is connected to the rear wall 14. Each of the first longitudinal partition wall 31, the second longitudinal partition wall 32, and the third longitudinal partition wall 33 extend linearly along the direction of the major axial line X which is inclined leftward toward the rear in plan view. The first longitudinal partition wall 31 is offset to the left with respect to the second longitudinal partition wall 32, and the third longitudinal partition wall 33 is offset to the right with respect to the second longitudinal partition wall 32. In other words, the first longitudinal partition wall 31, the second longitudinal partition wall 32, and the third longitudinal partition wall 33 extend in parallel with the major axial line X in a zigzag pattern so as to divide the cabin 5 into two substantially equal parts (mirror image of each other in plan view) with respect to the lateral direction.

The center of the cabin 5 with respect to the lateral direction and the longitudinal direction in plan view is defined as center O. The front end of the first longitudinal partition wall 31 is positioned to the right of the center O of the cabin 5, and the rear end of the first longitudinal partition wall 31 is positioned to the left of the center O of the cabin 5. The front end of the second longitudinal partition wall 32 is positioned forward and rightward with respect to the center O of the cabin 5, and the rear end of the second longitudinal partition wall 32 is positioned rearward and to the left of the center O of the cabin 5. The front end of the third longitudinal partition wall 33 is positioned to the right of the center O of the cabin 5, and the rear end of the third longitudinal partition wall 33 is positioned to the left of the center O of the cabin 5. The center of the second longitudinal partition wall 32 coincides with the center O of the cabin 5.

The partition walling 17 further includes a left transverse partition wall 35 that is connected between the left side wall 12 and the rear end of the first longitudinal partition wall 31 to separate the left part of the cabin 5 into the left front compartment 21 and the left rear compartment 23. The left transverse partition wall 35 includes a first left transverse partition wall 36 extending in the lateral direction to the right from the left side wall 12 to separate the rear part 21B of the left front compartment 21 and the rear part 23A of the left rear compartment 23 from each other in the fore and aft direction, a second left transverse partition wall 37 extending forward and rightward from the right end of the first left transverse partition wall 36 in parallel with the major axial line X to separate the rear part 21B of the left front compartment 21 and the front part 23B of the left rear compartment 23 from each other, and a third left transverse partition wall 38 extending rightward from the right end of the second left transverse partition wall 37 to the rear end of the first longitudinal partition wall 31 to separate the front part 21A of the left front compartment 21 and the front part 23B of the left rear compartment 23 from each other with respect to the fore and aft direction. The side face of the third left transverse partition wall 38 may be inclined leftward toward the rear.

The partition walling 17 further includes a right transverse partition wall 41 connected between the right side wall 13 and the front end of the third longitudinal partition wall 33 to separate the right part of the cabin 5 into the right front compartment 22 and the right rear compartment 24. The right transverse partition wall 41 includes a first right transverse partition wall 42 extending rightward from the front end of the third longitudinal partition wall 33 to separate the rear part 22B of the right front compartment 22 and the rear part 24A of the right rear compartment 24 from each other, a second right transverse partition wall 43 extending forward and rightward from the right end of the first right transverse partition wall 42 in parallel with the major axial line X, and a third right transverse partition wall 44 extending laterally between the right end of the second right transverse partition wall 43 and the right side wall 13 to separate the front part 22A of the right front compartment 22 and the front part 24B of the right rear compartment 24 from each other with respect to the longitudinal direction. The first left transverse partition wall 36 and the first right transverse partition wall 42 are positioned rearward from the center O of the cabin 5, and the third left transverse partition wall 38 and the third right transverse partition wall 44 are positioned forward from the center O of the cabin 5.

The left side wall 12 is provided with a left front door opening 51 in a part thereof corresponding to the front part 21A of the left front compartment 21, and a left rear door opening 52 in a part thereof corresponding to the rear part 23A of the left rear compartment 23. The right side wall 13 is provided with a right front door opening 53 in a part thereof corresponding to the front part 22A of the right front compartment 22, and a right rear door opening 54 is provided in a part thereof corresponding to the rear part 24A of the right rear compartment 24. The left front door opening 51, the left rear door opening 52, the right front door opening 53, and the right rear door opening 54 are fitted with a left front door 56, a left rear door 57, a right front door 58 and a right rear door 59, respectively. Each door may consist of a per se known hinged car door, but may also consist of a slide door. In the illustrated embodiment, the doors consist of hinged swing doors, and the front doors are each hinged at the front edge thereof so as to swing open in a forward direction while the rear doors are each hinged at the rear edge thereof so as to swing open in a rearward direction.

The rear end of the left front door opening 51 may be positioned so as to correspond to the rear part 21B of the left front compartment 21. Similarly, the front end of the right rear door opening 54 may be positioned so as to correspond to the front part 24B of the right rear compartment 24. The doors 56 to 59 may be provided with windows fitted with glazing such as transparent sheets of glass or plastic. In the illustrated embodiment, the left front door 56 and the right rear door 59 are each fitted with a window, while the right front door 58 and the left rear door 57 are not fitted with any such windows.

The left front compartment 21 and the right rear compartment 24 are formed in a 180° rotationally symmetric relationship with respect to the center O of the cabin 5. Likewise, the left rear compartment 23 and the right front compartment 22 are formed in a 180° rotationally symmetric relationship with respect to the center O of the cabin 5.

The front part 21A of the left front compartment 21 and the front part 22A of the right front compartment 22 are each provided with a seat 63 that faces obliquely rearward (left rearward) along the major axial line X. The rear part 23A of the left rear compartment 23 and the rear part 24A of the right rear compartment 24 are each provided with a seat 63 facing obliquely forward (right frontward) along the major axial line X. Each seat 63 has a seat cushion 64 and a seat back 65 pivotally attached to the seat cushion 64. The seat backs 65 of the seats 63 provided in the left front compartment 21 and the right front compartment 22 are each positioned on the front end of the seat cushion 64. The seat backs 65 of the seats 63 provided in the left rear compartment 23 and the right rear compartment 24 are each positioned on the rear end of the seat cushion 64.

The right side (inboard) wall of the left front compartment 21 formed by the first longitudinal partition wall 31, the third left transverse partition wall 38, and the second left transverse partition wall 37 is inclined leftward toward the rear so that the left front compartment 21 is formed in a wedge shape in plan view. The right rear compartment 24 is 180° rotationally symmetric to the left front compartment 21. The left side (inboard) wall of the right rear compartment 24 formed by the third longitudinal partition wall 33, the third right transverse partition wall 44, and the second right transverse partition wall 43 is inclined rightward toward the front so that the right rear compartment 24 is formed in a wedge shape in plan view.

The left side (inboard) wall of the front part 22A of the right front compartment 22 formed by the first longitudinal partition wall 31 is inclined leftward toward the rear, and the front part 22A of the right front compartment 22 gets wider toward the rear in plan view so that the front part 22A of the right front compartment 22 is substantially trapezoidal in shape in plan view. The two side (inboard and outboard) walls of the rear part 22B of the right front compartment 22 are formed by the second longitudinal partition walls 32 and second right transverse partition wall 43, respectively, which are substantially parallel to each other so that the rear part 22B of the right front compartment 22 is parallelepiped in shape in plan view.

The right side (inboard) wall of the rear part 23A of the left rear compartment 23 formed by the third longitudinal partition wall 33 is inclined rightward toward the front, and gets wider toward the front in plan view so that the rear part 23A of the left rear compartment 23 is substantially trapezoidal in shape in plan view. The two side (inboard and outboard) walls of the rear part 23A of the left rear compartment 23 are formed by the second longitudinal partition walls 32 and second left transverse partition wall 37, respectively, which are substantially parallel to each other so that the rear part 23A of the left rear compartment 23 is parallelepiped in shape in plan view.

The left front compartment 21 and the right rear compartment 24 are disposed such that the legs of the occupant are inclined in the outboard direction with respect to the fore and aft direction. The left rear compartment 23 and the right front compartment 22 are disposed such that the legs of the occupant are inclined in the inboard direction with respect to the fore and aft direction.

Figure 5:
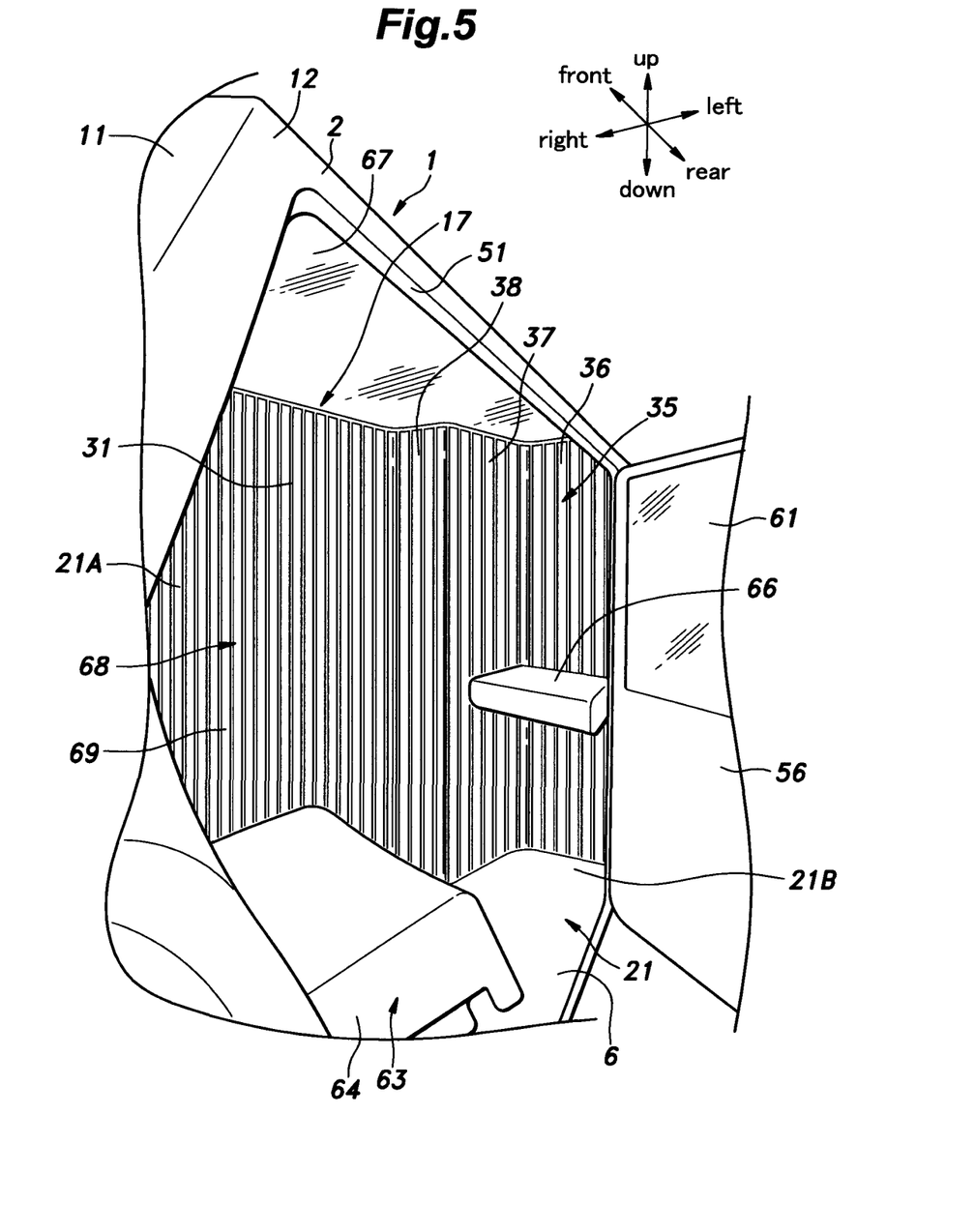
FIG. 5 is a perspective view of the left front compartment of the vehicle as seen from outboard side.
Figure 6:
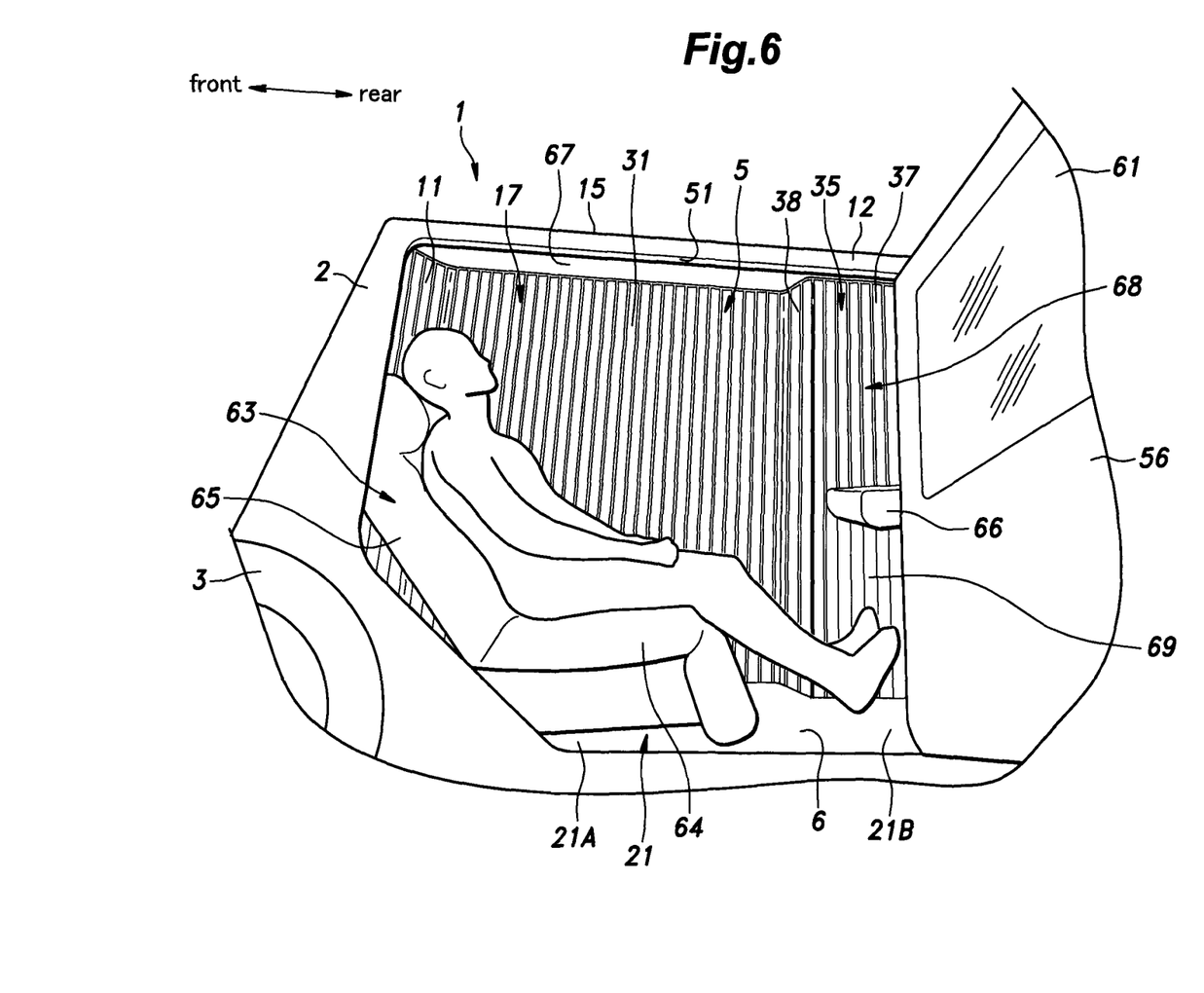
FIG. 6 is a side view the left front compartment of the vehicle as seen from outboard side.

As shown in FIGS. 4 to 6, a table 66 (or a desk) is provided in the rear part 21B of the left front compartment 21. The table 66 is formed of a plate or board member, and is attached to a part of the surrounding wall (the left side wall 12, the first left transverse partition wall 36, and/or the second left transverse partition wall 37) defining the rear part 21B of the left front compartment 21 via a latch and/or a hinge. Preferably, a space is created under the table 66, or between the table 66 and the floor 6 so that the occupant may place his or her feet on or under the table 66 as desired. The occupant can place a beverage container, a PC or the like on the table, and stow luggage on or under the table 66. If desired, the table 66 may be folded against a wall surface by unlatching the latch, and pivoting the table around the hinge. As shown in FIGS. 4 to 8, a table 66 is provided in each of the rear part 21B of the left front compartment 21, the front part 23B of the left rear compartment 23, and the front part 24B of the right rear compartment 24 in a similar as the table 66 of the left front compartment 21.

FIGS. 5 and 6 show the interior of the left front compartment 21. A transparent panel 67 made of glass, transparent plastic material or the like is provided in a part of the roof 15 corresponding to the left front compartment 21 (see FIG. 1). A vertical stripe pattern 68 is formed on the wall surface on the inboard side of the left front compartment 21 defined by the front wall 11, the first longitudinal partition wall 31, the third left transverse partition wall 38, the second left transverse partition wall 37, and the first left transverse partition wall 36. The vertical stripe pattern 68 is formed by a number of vertically extending recesses formed in the wall surface. These recesses may be formed in the material of the associated walls and the joints between the adjoining parts of the partition wall sections. The partition walls may be made of lumber boards. The vertical stripe pattern 68 creates an impression of a high ceiling, and is pleasing to the eyes of the occupant. The interior of the right rear compartment 24 may be similar to that of the left front compartment 21.

Figure 7:
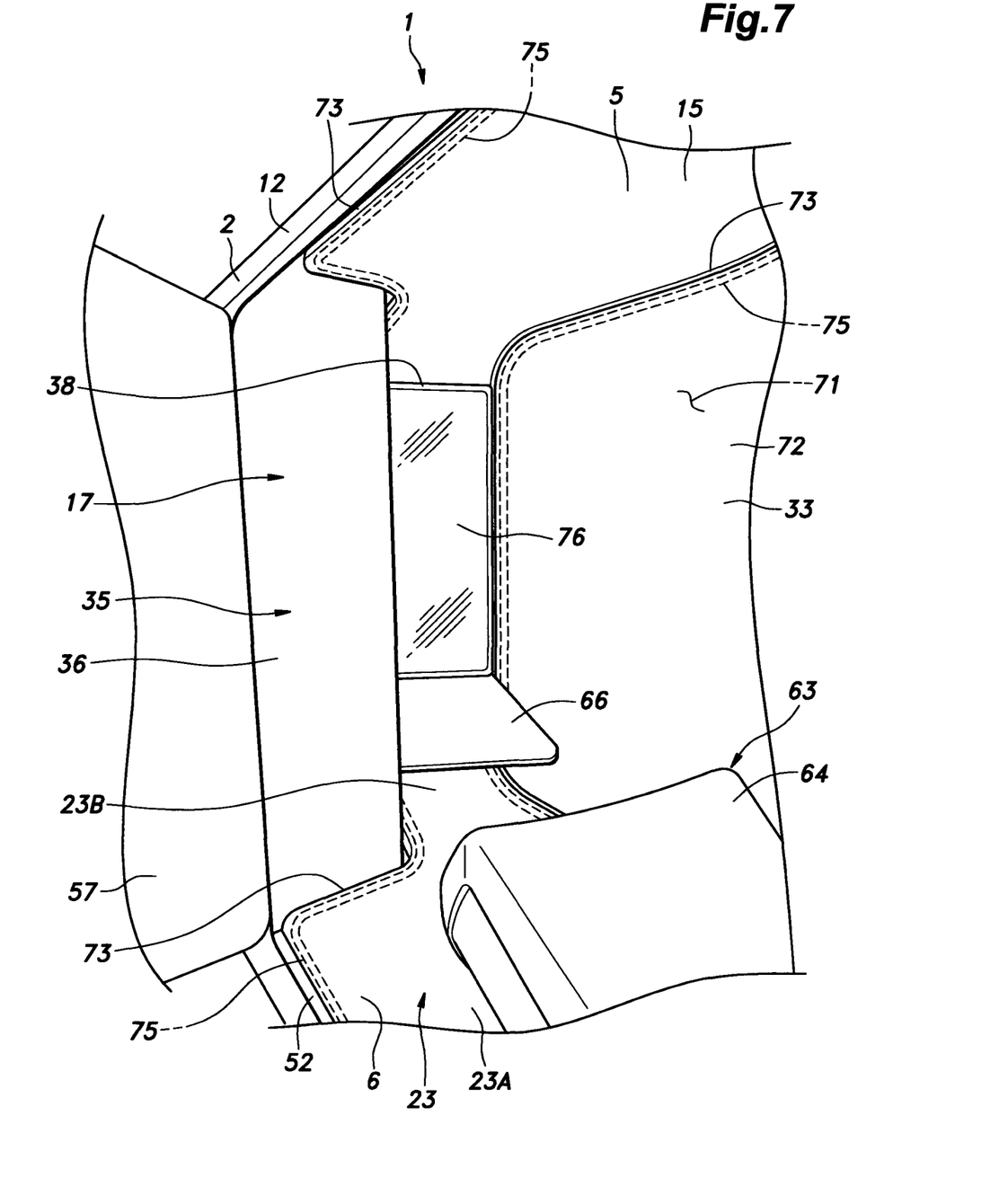
FIG. 7 is a perspective view of the left rear compartment of the vehicle as seen from outboard side.
Figure 8:
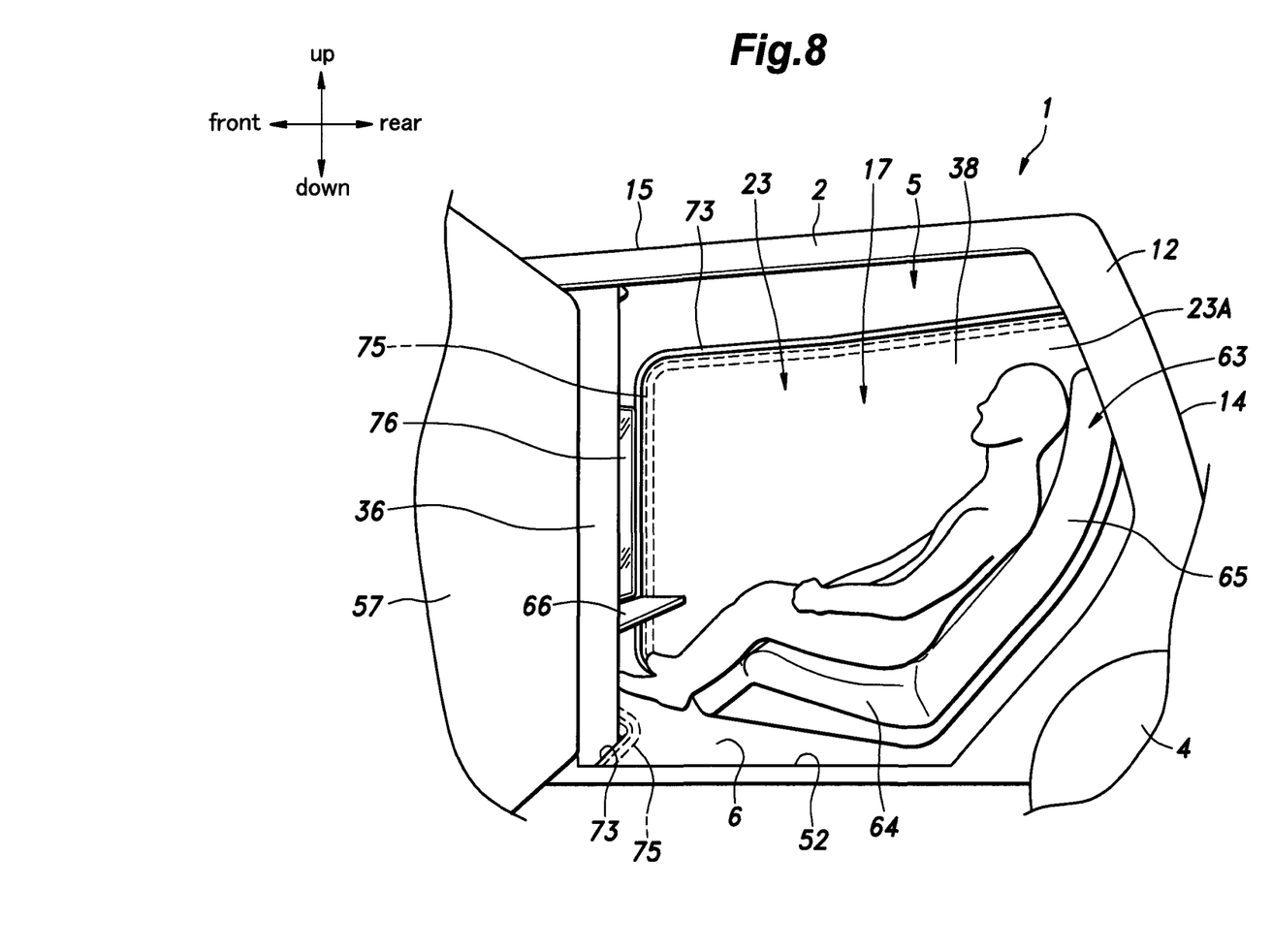
FIG. 8 is a side view the left rear compartment of the vehicle as seen from outboard side.

FIGS. 7 and 8 show the interior of the right front compartment 22. The inboard wall surface of the right front compartment 22, formed by the front wall 11, the first longitudinal partition wall 31, the second longitudinal partition wall 32, the second right transverse partition wall 43, and the third right transverse partition wall 44, consists of a padded wall surface formed by a pad layer 71 and a skin material 72 covering the pad layer 71. A groove 73 extends along the boundary between the floor 6 and the partition walls, between the roof 15 and the partition walls, between the second longitudinal partition wall 32 and the second right transverse partition wall 43, and between the second right transverse partition wall 43 and the first right transverse partition wall 42. A plurality of light emitters such as light bulbs and LEDs are received in this groove so as to form an indirect illumination 75. The surface of the first right transverse partition wall 42 opposing the occupant is provided with a display 76 such as an LCD panel and an organic EL. The right front compartment 22 has no window, and is shut off from external light. The lighting for the right front compartment 22 is provided by the indirect illumination 75. The interior of the left rear compartment 23 may be similar to that of the right front compartment 22.

The vehicle 1 of the illustrated embodiment has two front compartments 21 and 22 and two rear compartments 23 and 24 partitioned by the partition walling 17. Since the major axial lines X of the front compartments 21 and 22 and the rear compartments 23 and 24 are parallel to each other, and inclined with respect to the fore and aft direction of the vehicle, the length of each compartment along the major axial line X thereof can be maximized so that the occupant can take advantage of the maximized leg room, and can be seated in a comfortable manner.

Furthermore, since the front part 23B of the left rear compartment 23 extends into the space defined between the rear part 21B of the left front compartment 21 and the rear part 22B of the right front compartment 22, the length of the left rear compartment 23 along the major axial line X can be particularly maximized. Similarly, since the rear part 22B of the right front compartment 22 extends into the space defined between the front part 23B of the left rear compartment 23 and the front part 24B of the right rear compartment 24, the length of the right front compartment 22 along the major axial line X can be particularly maximized. Since the front part 24B of the right rear compartment 24 is positioned on the right side of the rear part 22B of the right front compartment 22, the length of the right rear compartment 24 along the major axial line X can be particularly maximized. Similarly, since the rear part 21B of the left front compartment 21 is positioned on the left side of the front part 23B of the left rear compartment 23, the length of the left front compartment 21 along the major axial line X can be particularly maximized. By thus arranging the rear part 21B of the left front compartment 21, the rear part 22B of the right front compartment 22, the front part 23B of the left rear compartment 23, and the front part 24B of the right rear compartment 24 in an interdigitating manner, the length of each compartment for the given size and dimensions of the vehicle can be maximized.

Since the seats 63 are provided so as to face obliquely rearward in the front part 21A of the left front compartment 21 and the front part 22A of the right front compartment 22, respectively, the seats 63 can be conveniently positioned in the respective front parts 21A and 22A each having a relatively large width while the legs of the occupants are placed in the respective rear parts 21B and 22B each having a relatively small width. This is advantageous because the upper part of the occupant generally requires a larger width than the legs. The rear compartments 23 and 24 are also arranged in a similar manner.

Since the left front compartment 21, the right front compartment 22, the left rear compartment 23 and the right rear compartment 24 are arranged such that the combined outer profile of these compartment in plan view is substantially rectangular so that the available space of the vehicle which is typically rectangular in shape can be optimally utilized. In particular, the present invention can be advantageously applied to compact or other small passenger vehicles.

By using the table 66 as a foot rest of the occupant, the occupant's comfort can be enhanced. The table 66 may also be used as a desk or a luggage storage area.

The left front compartment 21 and the right rear compartment 24 are formed in a mutually rotationally symmetric manner about the center O of the cabin 5, and the right front compartment 22 and the left rear compartment 23 are likewise formed in a mutually rotationally symmetric manner about the center O of the cabin 5. Thereby, the compartments can be arranged in an efficient manner, and common upholstery members can be shared by the different compartments.

Since the different compartments 21 to 24 are provided with the individual doors 56 to 59, the occupants can board the vehicle without seeing the fellow passengers so that the privacy of the occupants can be ensured.

Since the vehicle 1 of the illustrated embodiment is an autonomous vehicle, no driver's seat is required. Therefore, a substantially entire part of the vehicle 1 can be dedicated to the use of the occupants. If desired, an additional space may be provided in a front part of the vehicle to accommodate a driver's seat. If desired, the front compartment 21 or the right front compartment 22 may be converted into a driver's compartment. In such a case, the relevant part of the front wall 11 may be provided with a transparent windshield for the convenience of driving.

The vehicle 1 of the illustrated embodiment is particularly suitable for ride sharing.

Although the present invention has been described in terms of a specific embodiment, the present invention can be modified and substituted without departing from the spirit of the present invention. For instance, the major axial line X of each compartment may tilt rightward toward the rear, instead of tilting leftward toward the rear.

The invention claimed is:

1. A vehicle, comprising
a pair of front compartments and a pair of rear compartments separated from each other by partition walling;
wherein the front compartments and the rear compartments are inclined to a first lateral side toward rear parts thereof, and
a front part of the rear compartment on the first lateral side is positioned between rear parts of the front compartments while a rear part of the front compartment on a second lateral side opposite from the first lateral side is positioned between front parts of the rear compartments.

2. The vehicle according to claim 1, wherein a front part of the rear compartment on the second lateral side is positioned on the second lateral side of a rear part of the front compartment on the second lateral side.

3. The vehicle according to claim 1, wherein a rear part of the front compartment on the first lateral side is positioned on the first lateral side of a front part of the rear compartment on the first lateral side.

4. The vehicle according to claim 1, wherein a front part of each front compartment is laterally wider than the rear part thereof, and a rear part of each rear compartment is laterally wider that the front part thereof.

5. The vehicle according to claim 1, wherein the front compartments are each provided with a seat facing obliquely rearward, and the rear compartments are each provided with a seat facing obliquely forward.

6. The vehicle according to claim 1, wherein a combined outer profile of the front compartments and the rear compartments in plan view is substantially rectangular.

7. The vehicle according to claim 1, wherein at least one of the front parts of the rear compartments and the rear parts of the front compartments is provided with a table.

8. The vehicle according to claim 1, wherein the front compartment on the first lateral side and the rear compartment on the second lateral side are rotationally symmetric to each other, and the front compartment on the second lateral side and the rear compartment on the first lateral side are rotational symmetric to each other.

9. The vehicle according to claim 1, wherein the different compartments are provided with individual doors.

10. The vehicle according to claim 1, wherein the vehicle comprises an autonomous vehicle.

11. The vehicle according to claim 1, wherein the vehicle has a capacity for four occupants.

* * * * *